United States Patent [19]

Thomé

[11] 4,196,334
[45] Apr. 1, 1980

[54] METHOD FOR ASSEMBLING VERTICAL DUCTS BY ELECTRON-WELDING

[76] Inventor: Paul Thomé, 8 rue Coutureau, 92210 Saint-Cloud, France

[21] Appl. No.: 899,681

[22] Filed: Apr. 24, 1978

[30] Foreign Application Priority Data

May 2, 1977 [FR] France ............................... 77 13162

[51] Int. Cl.² ........................................... B23K 31/06
[52] U.S. Cl. ................................. 219/61; 219/60 A; 219/72; 405/170
[58] Field of Search .............. 219/137 R, 61, 72, 59.1; 405/170

[56] References Cited

U.S. PATENT DOCUMENTS

| | | | |
|---|---|---|---|
| 3,727,025 | 4/1973 | Benedetto | 219/61 X |
| 3,795,115 | 3/1974 | Bergquist | 405/170 |
| 4,133,180 | 1/1979 | Nobileau | 219/137 R X |

*Primary Examiner*—E. A. Goldberg
*Attorney, Agent, or Firm*—Millen & White

[57] ABSTRACT

A method for assembling successive ducts end to end with a pipe-line constituted by the assembled ducts comprising: providing inner equipments for said ducts each comprising means for vacuum-tight connection with the inside of a duct and means protruding from the duct for vacuum tight connection with the pipe-line; placing said inner equipments in each successive duct in an equipping station, connecting said equipment to the inside of the duct at both ends to close an inner vacuum tight space inside the duct; connecting said space to pumping means and evacuating said inner space by said pumping means while transferring said duct and inner equipment from said equipping station to a welding station; positioning said duct in alignment and abutment end to end with the pipe-line in said welding station; locking the duct in fixed position with respect to the pipe-line, sealingly connecting said equipment with the pipe-line inside the pipe-line, and sealingly connecting a vacuum tight welding chamber of a rotative welding apparatus with the duct and the pipe-line outside their abutment ends; welding said abutting ends under vacuum using said welding apparatus; unlocking and unsealing the inner equipment from the duct and pipe-line, disconnecting the welding chamber, and letting the pipe-line fall down by one duct length; returning the inner equipment from said duct back to the equipping station; and repeating the operating sequence with each successive duct.

2 Claims, 7 Drawing Figures

METHOD FOR ASSEMBLING VERTICAL DUCTS BY ELECTRON-WELDING

The invention relates to the welding of ducts. It is useful in particular in off-shore well drilling and pipe-line laying for assembling ducts to be welded together at their ends while they stand in a vertical position. It makes is possible to use electron welding to connect successive vertical ducts to a pipe which is gradually lowered and can be for instance either a well casing in off-shore drilling or a pipe-line being layed down in a deep sea. It has the advantage of reducing down to about five minutes the time required for the complete sequence of assembling steps, and to require only two working stations, one for welding, the other for the thermal treatment, non destructive control and protective coating of the pipe-line about the weld.

Objects of the invention relate to:

(1) equipping the ducts in an equipping station with a device (inner evacuating equipment) permitting to place each duct under vacuum prior to bringing it into the welding position, thus reducing the duration of the pumpimg operation;

(2) transferring the thus equipped ducts from the equipping station to a buffer-storage area;

(3) moving the ducts supported by a carrousal in the 'buffer-storage' area and simultaneously evacuating the ducts by vacuum pumping;

(4) transferring each equipped duct, under continuous pumping in the vicinity of the welding station while the preceding duct is being welded, then positioning said duct and aligning it with the pipe-line once the latter has been lowered down a distance equal to the length of the preceding welded duct;

(5) similarly transferring back the inner equipment of the duct, up to a rotative storage means (carrousal);

(6) storing and checking said equipments;

(7) returning said equipments to the equipping station where they are mounted on further ducts;

(8) adjustably bringing the duct into abutting contact end to end with the pipe-line which has been already immersed by about the length of a duct (with a manual correction if desired), then locking said duct to the pipe-line;

(9) possible welding of the duct while the pipe-line is being released or hoisted, and also during the vessel vertical fluctuations (thumping).

It is to be noted that, for the sake of reliability and simplicity, the means used at stations or steps 2 and 7, 3 and 6, 4 and 5, are preferably interchangeable.

The present invention also relates to the following means and their use:

(a) an inner equipment for the ducts comprising a rod connecting a plug for the duct with obturators and comprising devices for clamping vacuum tight seals with the duct and with the pipe-line, and means for securing or locking the duct with respect to the pipe-line, said equipment being adapted to evacuate the inside space of the duct prior to bringing it into abutting contact with the pipe-line, and to maintain said duct rigidly secured to the pipe while it is being welded to the pipe-line;

(b) an electron-welding apparatus, comprising radial securing vices, axial adjustment means and horizontal balance adjustment means, means for centering the duct in the pipe-line, means for controlling the clamping of the seals, a member movable with respect to the pipe-line and carrying the electron-gun, and a rotary hoisting ring;

(c) a single or multiple rotary operating platform constructed as a turret rotating around the pipe-line during the welding operation, said platform being adapted to support the operator, the sources of power and the fluid supply containers, pumping units, etc., and being rigidly securable to the movable portion of the welding apparatus, the height of sad turret being adjustable with respect to the pipe-line.

The invention will be more completely described with reference to the appended drawings, in which:

FIG. 1a shows a vertically extending structure, or derrick, 203, adapted to slide inside another structure 303, the latter being integral with a vessel.

Figure 1:
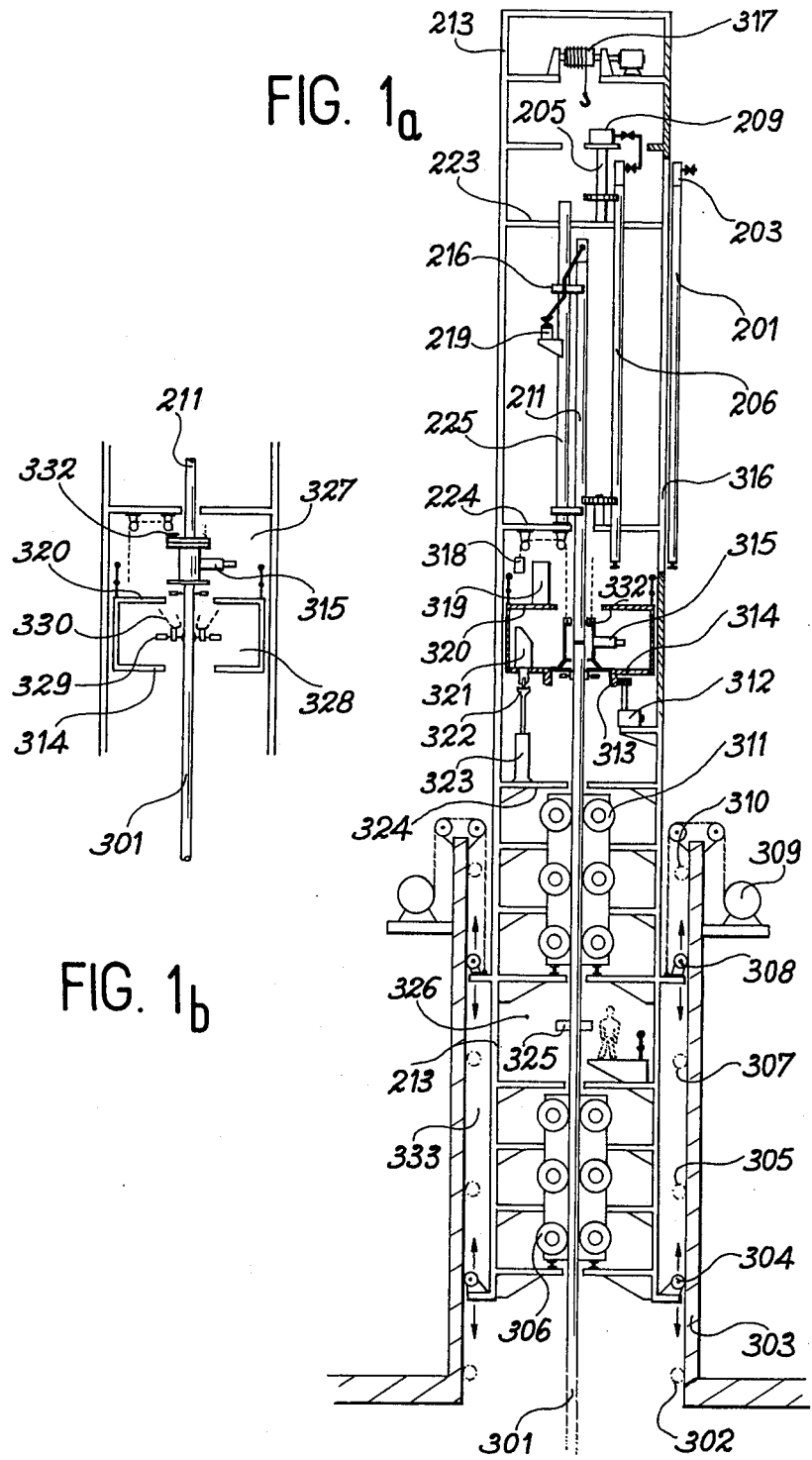
FIG. 1a is a vertical view of a unit of the invention for laying pipe-lines down in the sea.
FIG. 1b shows a detail of the welding apparatus in another position.

The movements are controlled by a device for compensating vertical fluctuations of the vessel with respect to the pipe-line, said device comprising winches 309. The amplitude of the vertical fluctuations corresponds to the extreme positions shown at 310 and 307, 305 and 302 of respective displacement guiding rollers 308 and 304 provided at the periphery of the derrick, and it is of about six meters (20 yds). In its lower portion the derrick comprises pressure rollers 306, 311, adapted to control the downward and upward movements of pipe-line 301. These rollers are grouped as two tensioning devices placed on either sides of a working area 326, or weld control and finishing station, in which are carried out a non-destructive control (at 325), an optional thermal treatment, and the application of an anti-corrosion coating on the fresh weld.

At an upper level, on floor 324, are mounted the devices 323 for vertically moving a turret 314–315, as well as means 312 for rotating this turret. The former devices comprise jacks 322 with bearing raceways for the turret and the latter comprise a motor driving a pinion engaging with a crown-gear or toothed wheel 313. The turret comprises two working floors 314, 320. On the lower floor 314 is located the assembling or welding station, where the welds are made by means of an electron-welding apparatus 315. Said lower level also contains control racks and membes for aligning the ducts with the pipe-line; in addition, it is on this level that the operator stands. The higher level, on the other hand, is reserved for the vacuum pumping-unit, the H-V generator 319 and various fluid supply lines. In the course of welding operations, the whole turret is rotated about the pipe-line, as well as the mobile part of the electron-welding machine which is rigidly secured to the turret. The welding apparatus is hangingly attached to a floor 224 of the derrick through an annular ball-bearing 332 which provides for the rotation movements of said apparatus; the latter is balanced by a counter-weight 318. Due to this construction, the welding apparatus 315 can be upwardly removed away from the lower working level, through the upper working level towards the floor 224, that is over the welding level into upper chamber 327 (FIG. 1b) whenever a duct is being aligned with and abutted against the end of the pipe-line.

Alignment is achieved using vices 329 clamped onto the pipe-line and guiding lever arms 330. During the aligning operation, the whole space 328 between the two working levels of the turret is cleared for permitting manual interventions and direct observations. Once the alignment has been accomplished, the locking means carried by the inner equipment (as will be seen later on) are energized, thus providing a rigid locking of the duct with respect to the pipe-line.

Above floor 224 are located the areas where the various preparation works on the ducts are performed, viz. feeding storage, pumping out and positioning of the duct in abutment end to end with the pipe-line. The individual ducts 201, previously equipped with their respective evacuating inner equipments provided with sealing plugs 203, are introduced into the derrick structure 213 through an opening 316. The ducts then reach a carrousal or revolving holder (rotative storage means) 205 having the double function of a storage-buffer and a pumping station 209 for the ducts (as for duct 206). The ducts are then picked up from said carrousal by robots 216, which, by sliding along column 225, serve to bring each duct in a first stage in the vicinity of the assembling or welding station, while the previous duct is being welded, then, in a second stage, to position said duct (211) into butt contact with pipe-line 301, once the latter has been released by the guiding pressure rollers down to the desired level. During these operating steps, the duct is continuously evacuated by pumping units 219 which are supported by the robots. Working floors such as 223 provide access to each of the mechanical devices. At the top end of the derrick is mounted a winch 317 which is used for picking up back the pipe-line and, in case of emergency, as a spare device for handling the inner equipments and the ducts.

Figure 2:
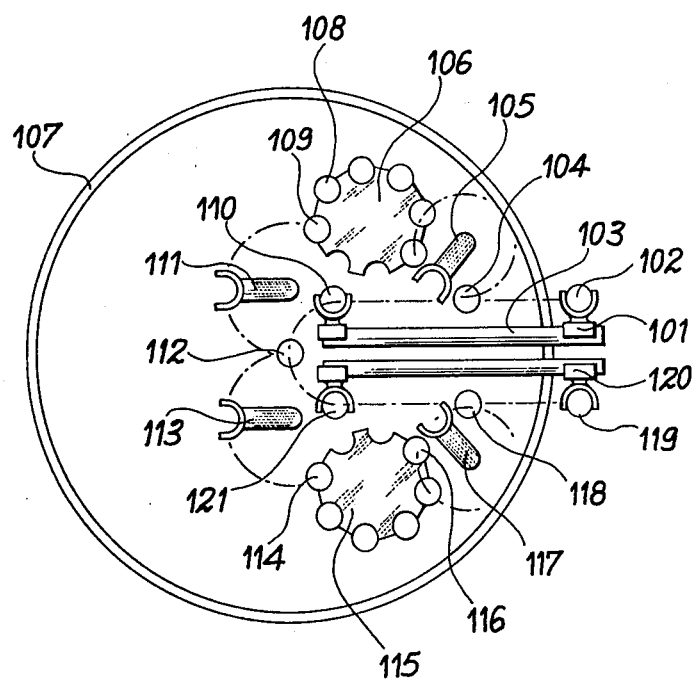
FIG. 2 is a plan view showing the lateral transfer means, and rotative storage means for the ducts and inner equipment (carrousals), and the robots for transferring the ducts to or the inner equipments from the welding station.

FIG. 2 shows, in a cross sectional view, how the ducts and the associated inner equipments are moved.

The ducts from the equipping station are carried by means of conveyors (not shown) into position 102 where they are gripped by a lateral transfer member 101 provided with nippers. The transfer member moves along track 103 and introduces the duct into the derrick casing 107, said derrick being supported by the means for compensating the vessel vertical fluctuations described in connection with FIG. 1. The transfer member then carries the duct into position 104, where it is gripped by a robot 105 which is rotatively mounted on the derrick and has radially slidable clamping jaws. The duct is then brought by the robot to carrousal 106 (having reference 205 on FIG. 1) and stored in a place such as 108. The carrousal is incrementally rotated at each of the various operating steps. When at place 109, the duct is gripped by a robot 111, similar to robot 105, that removes the duct from the carrousal and carries it, in two increment stages, to position 112 where it is brought into abutment with the pipe-line.

A second transfer-storage line is arranged symmetrically for returning the inner equipment of the duct (see hereinafter) back to the equipping station by means of robot 113 (taking them from position 112 to position 114), carrousal 115, robot 117 (which takes them from the carrousal at 116 over to the transfer member at 118), and lateral transfer member 120. The inner equipments leave the derrick at position 119. The positioning and adjustment of these inner equipments within the ducts are carried out in the equipping station outside the derrick.

In order to render the various handling devices more reliable, it is further provided that the lateral transfer member can drive duct 102 directly up to a position 110 for positioning in abutment with the pipe-line, and that the symmetrical lateral transfer member can also seize the inner equipments directly at position 112 to carry them to 119. With such an arrangement, it is possible to obviate the operation failures of the carrousals without much damage.

Figure 3:
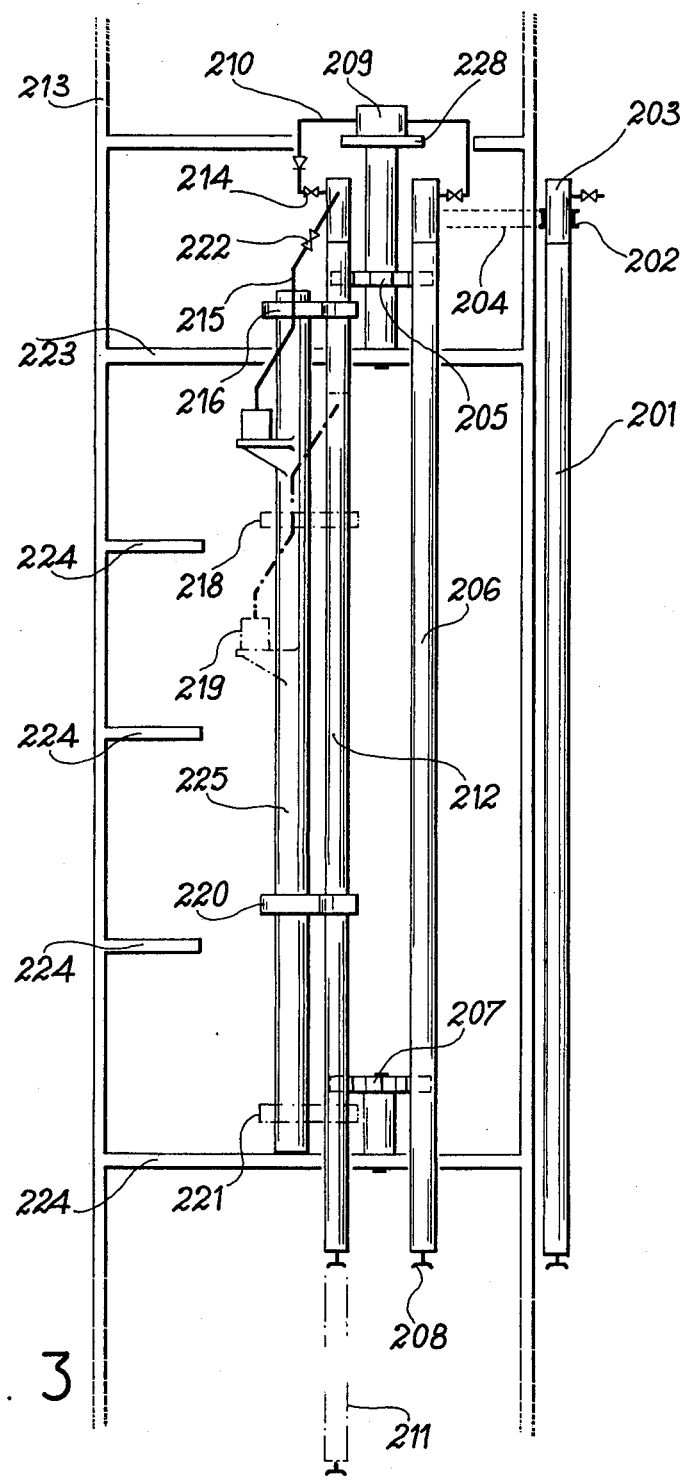
FIG. 3 is a vertical view of part of the unit.

The above movements can be more clearly explained with reference to FIG. 3.

Duct 201 equipped with the associated inner equipment and sealing plug 203 is gripped by nippers or jaws 202 provided ont the lateral transfer member. The latter moves along track 204 (same as 103 on FIG. 2). The duct with its associated equipment is then stored on carrousal plate 205. It is guided during the rotation by another carrousal plate 207 provided near the lower end of the ducts while the first one holds them near the upper end.

A conventional pumping unit 209 placed axially on a top plate 228 of the carrousal is used to evacuate the duct through pumping lines 210 which form a vacuum circuit having valves 214 for isolating the ducts from said lines.

Robots 216 and 220, which can slide along column 225, are used to grip a duct 212 which has already been moved by the carrousal to position 109 of FIG. 2. As soon as the duct has been gripped, it is connected to pumping unit 219 which is mounted on the upper robot and duct 210 is disconnected. Valves such as 214 and 222 make that operative step possible without breaking the vacuum in the duct.

The duct is moved by the robot radially, then vertically so as to come close to the abutting position. It is then engaged end to end against the pipe-line once the latter has been released by a distance equal to the length of a duct after a complete assembling cycle. When the duct is in abutment with the pipe-line, robots 216 (with the pumping unit) and 220 have moved down to 218, 221, and the duct is in the position illustrated at 211. Working floors 223 and 224 of the derrick provide direct access to all the mechanical devices.

When the duct has been locked to the pipe-line (see hereinafter), the robots for hoisting and forwarding the inner equipments, which are not shown on FIG. 3 and have reference numbers 111 and 105 on FIG. 2, are in turn connected to the duct, or rather to the upper plug of the inner equipment, and a further pumping-unit similar to unit 219 is used instead of the latter. Robots 216 and 221 release their grip and come back to their original positions for a further operating cycle. After the welding step, the inner equipment is unlocked from the duct (see hereinafter); vacuum is broken and the equipment is then hoisted up to carrousal 115 of FIG. 2.

Figure 4A:
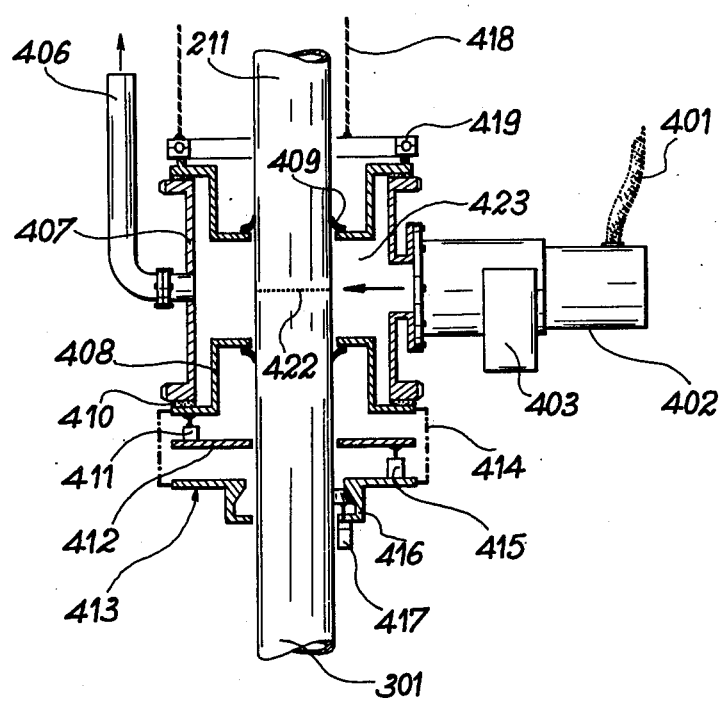
FIG. 4a and FIG. 4b show in vertical and plan views the welding apparatus.
Figure 4B:
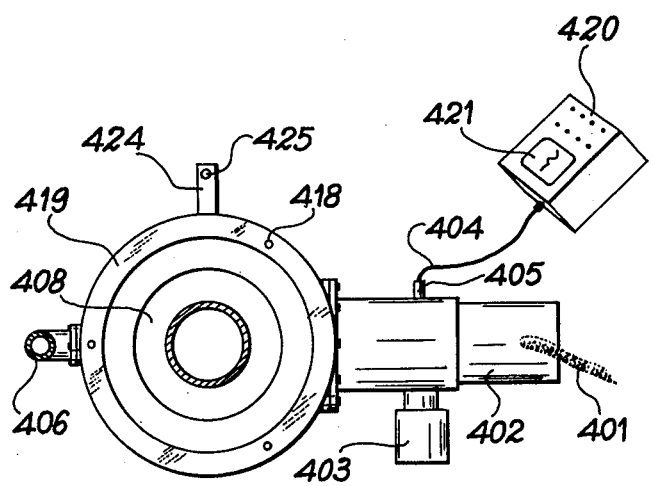

FIGS. 4a and 4b are cross-sections, in elevation and in plan view respectively, of the electron-welding equipment.

The welding apparatus has an annular shape and the duct to be welded as well as the pipe-line pass therethrough.

The apparatus comprises a welding chamber delimitating an evacuated space 423, under vacuum, which sealingly surrounds pipe-line 301 and duct 211 by means of seals 409 which are "sole" seals similar to those described in French patent application 75.13896 (publication n° 2,310,186) and are clamped onto the pipe or duct by means not shown. The chamber proper comprises a movable portion 407 adapted to rotate about the pipe-line during the welding operation, and a stationary portion 408. Tightness between said two portions is obtained by means of annular seals 410.

The movable portion carries an electron gun 402 in which a secondary vacuum is ensured by a pump 403. Said gun is supplied with a high voltage current by line 401 and, in addition, it is provided with a sighting glass connected to a TV-camera 405 for transmitting the image onto screen 421, via line 404. The chamber is evacuated to reach a primary vacuum via line 406 connected to the movable portion.

The stationary portion at its bottom carries a securing device 413 provided with jaws 416 cooperating with jacks 417 engaged therewith so as to rigidly secure the welding apparatus to pipe-line 301. The securing device 413 is further provided with jacks 415 serving to adjust the vertical position of the welding machine with respect to the plane 422 of the weld, by adjusting the axial distance between two major radial plates of the device. A finer adjustment of the welding machine with respect to the horizontal plane is obtained by means of jacks 411 provided between the upper plate of the securing device and the underface of the stationary portion 408. On the figure, the means for vertically moving the welding machine with respect to device 413 are diagrammatically represented by a sliding connection 414. They may be of any type known per se. When the welding apparatus is disconnected from the pipe-line, it is supported by cables 418 connected to counterweight 318 of FIG. 1. These cables permit to remove the welding apparatus and keep it out of the weld plane during the engaging manipulation, when a duct is being brought into butt contact with the pipe-line. These cables are connected to ball-ring 419. The operator controls the welding steps from panel-board 420. During all welding operations, the movable portion of the machine is fastened to turret 314 (FIG. 1) by means of arm 424 and pin 425 (FIG. 4b).

Figure 5:
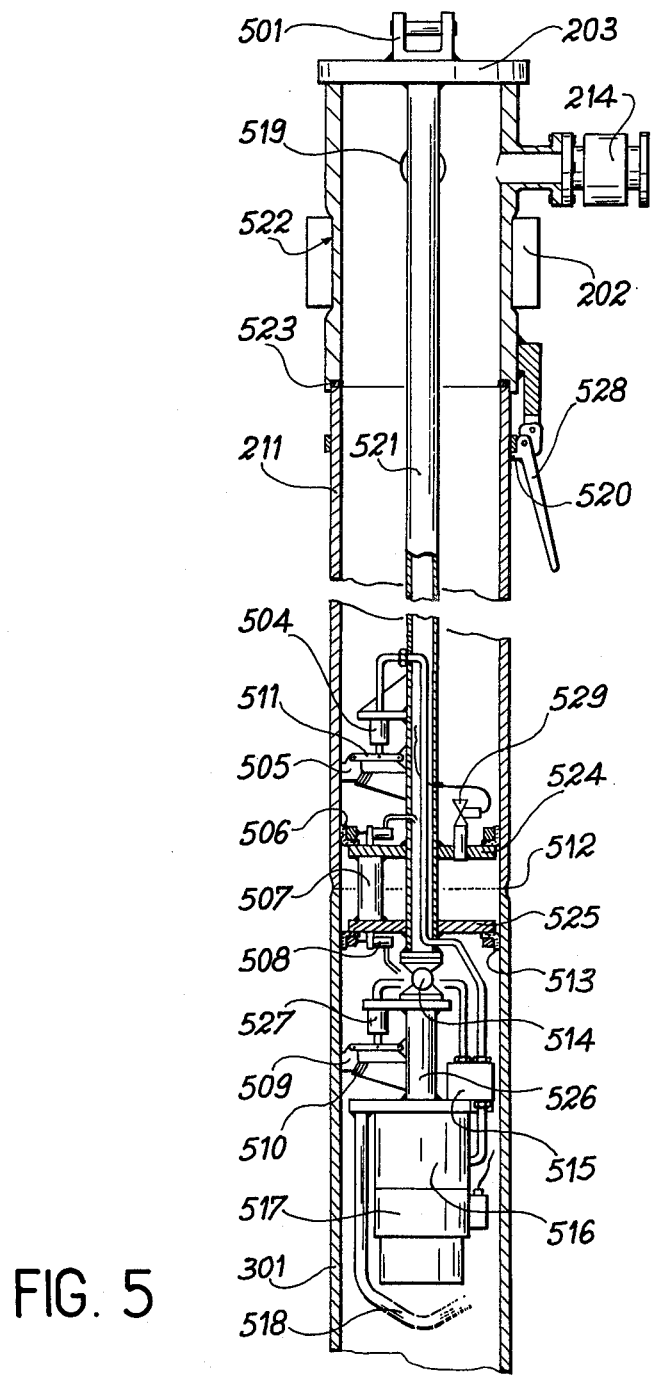
FIG. 5 is a general view of an inner equipment in a duct in abutment with the pipe-line in the welding station.

The evacuating or temporary inner equipment of the ducts, is represented on FIG. 5. It is adapted to be inserted into any duct 211 before the latter is brought into contact with the pipe-lines.

The equipment comprises an axial rod 521, integral with a plug 203 for duct 211 which is provided with at least two pumping ports 519 having isolating valves 214, a fork york 501 for coupling with a lifting tackle (not shown), a bearing surface 522 formed by a recess in the outer surface of the plug for receiving the handling nippers 202, a seal 523 at the lower end of the plug and a securing device for coupling the plug and inner equipment with the duct which comprises locking lugs 520 engageable with an annular rim of duct 211 using lever arms 528.

This inner equipment, in addition, is provided with an axial hollow rod 521 connecting the plug 203 with the lower part of the equipment which comprises two obturators and a locking device for locking the inner equipment of a duct with the pipe-line. The first obturator 524 provides the desired vacuum tightness inside the duct, while the second obturator 525, which protrudes beyond the duct during the handling steps, acts as a seal on the pipe-line, thus permitting to create a vacuum in the space between the two operators at the back side of weld 512 by opening a valve 529 through obturator 524 and thereby connecting said space with the duct inside. The 'shoe' seals 506, 513, of obturators are applied against the inner peripheral faces of the duct and the pipe-line by means of jacks such as 508.

The locking device comprises two parts connected by a ball-and-socket joint 514. A hydraulic device is mounted on the lower part of the locking device. The two obturators are connected to each other by columns 507; the evacuation of the space defined by said two obturators is initiated by the opening of electro-magnetic valve 529. The upper part of the locking device provides for the centering of the axial rod 521 and its clamping onto the end part of the duct, through shims, or wedges, 505, controlled by hydraulic jacks 504 acting upon levers 511. Thus is obtained a unit that in solid with the duct. The lower part of the locking device is provided with an axle 526 connected to the ball-and-socket joint 514. Said axle supports the hydraulic controlling unit 516 with its manifold 515, said unit supplying all the jacks and being outside of the evacuated spaces. It is further provided with clamping wedges 509 controlled by hydraulic jacks 527 through levers and moved thereby along inclined bearing surfaces 510. A bumper 518 extends from the lower part of the locking device. Pressurizing jacks 504 and 527 induce the locking of the duct 211 onto pipe-line 301, and the clamping of the ball-and-socket joint 514.

A preferred embodiment of the invention has been described hereinbefore in connection with an installation for effecting so-called J-laying of pipe-lines in the sea, but it should be understood that the pipe which has been designated as a pipe-line, in the description of this embodiment and in the claims, could as be any pipe at the end of which successive ducts are welded, such as a well casing in off-shore drilling, without departing from the scope of the invention.

I claim:

1. A method for assembling successive ducts end to end with a pipe-line constituted by the assembled ducts comprising:

providing inner equipments for said ducts each comprising means for vacuum-tight connection with the inside of a duct and means protruding from the duct for vacuum tight connection with the pipe-line, placing said inner equipments in each successive duct in an equipping station, connecting said equipment to the inside of the duct at both ends to close an inner vacuum tight space inside the duct, connecting said space to pumping means and evacuating said inner space by said pumping means while transferring said duct and inner equipment from said equipping station to a welding station, positioning said duct in alignment and abutment end to end with the pipe-line in said welding station, locking the duct in fixed position with respect to the pipe-line, sealingly connecting said equipment with the pipe-line inside the pipe-line, and sealingly connecting a vacuum tight welding chamber of a rotative welding apparatus with the duct and the pipe-line outside their abutting ends, welding said abutting ends under vacuum using said welding apparatus, unlocking and unsealing the inner equipment from the duct and pipe-line, disconnecting the welding chamber, and letting the pipe-line fall down by one duct length, returning the inner equipment from said duct back to the equipping station, and repeating the operating sequence with each successive duct.

2. A method according to claim 1, wherein said duct equipped with an inner equipment is first transferred laterally from said equipping station to a rotative storage carrousal through a derrick casing, then from said carrousal to a position where it is in alignment with the pipe-line, then moved axially downwards into abutting engagement with the pipe-line.

* * * * *